Aug. 15, 1967     R. H. HEDRICK     3,335,575
FREEZE CONCENTRATION PROCESS
Filed Oct. 16, 1963
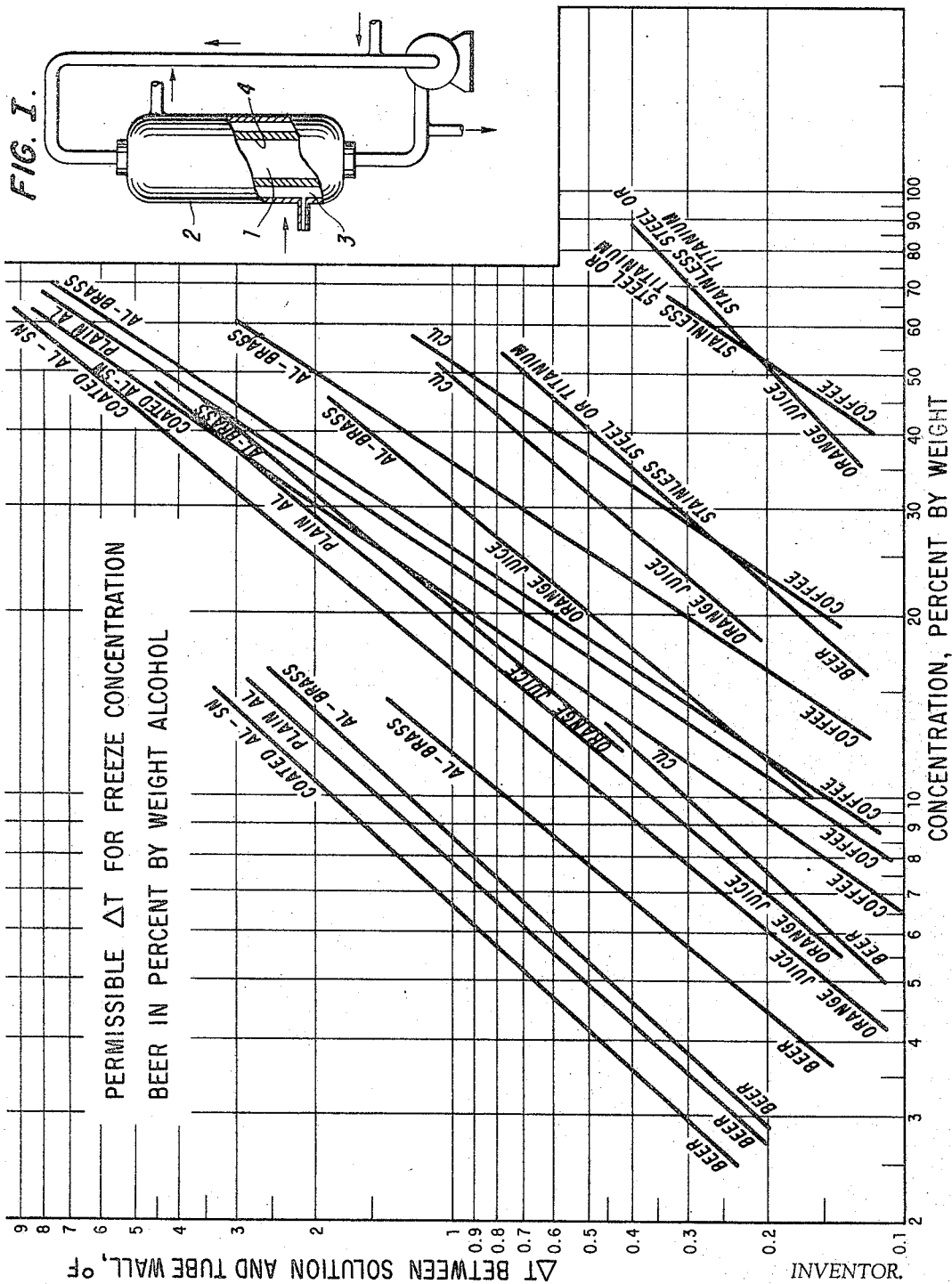
INVENTOR.
ROBERT H. HEDRICK
BY
ATTORNEY

United States Patent Office 3,335,575
Patented Aug. 15, 1967

3,335,575
FREEZE CONCENTRATION PROCESS
Robert H. Hedrick, Warren, Pa., assignor to Struthers Scientific and International Corporation, New York, N.Y., a corporation of Delaware
Filed Oct. 16, 1963, Ser. No. 316,619
1 Claim. (Cl. 62—58)

This invention relates to a process for the removal of water by its crystallization from aqueous multiphase mixtures, slurries and the like, separating the crystals and thereby concentrating the liquid phase, and more particularly relates to a process for the concentration of aqueous solutions by a process in which the heat of crystallization is preferentially released on free nuclei as crystal growth.

The prior art describes processes in which the solvent of a solution is frozen, crystals are formed and the resulting crystals separated, thus either concentrating the solution or liberating the solvent from the solution for use as a food or drink concentrate. In carrying out such processes of the art, the solution may be brought into contact with a heat transfer surface such, for example, as the external surface of an internally cooled drum which is immersed in the solution to be concentrated, or the internal surface of an externally cooled cylinder. Usually the heat exchange surface is maintained below the freezing temperature of the solution being treated, the ice is formed on the heat exchange surface, and removed from the surface by scraping. In contradistinction to such processes of the art, the invention herein described effects the freezing of aqueous solutions by an indirect heat exchange process and the use of heat transfer surfaces in which the heat of crystallization is released not on the heat transfer surface by nucleation and crystal growth on the surface, but by crystal growth on crystals freely moving and well dispersed in the solution being concentrated.

Objects of the invention include: an improved process for the concentration of potable aqueous liquids and for controlled crystallization of water in and separation of the crystals from such liquids; the crystallization and environmental control of crystal growth to insure that it takes place in the solution being concentrated and not on the heat transfer surfaces or equipment in which the crystallization is carried out; the provision in such processes of heat transfer surfaces having low surface energies; the provision of heat transfer surfaces that permit a high heat through-put and the inhibition of crystal deposition; processes and apparatus in which materials for heat transfer surfaces are used that avoid surface crystal formation at high heat transfer rates; the provision of a process by crystallization of water from an aqueous slurry of ice by crystal growth and by nucleation restricted to the slurry. Other objects and advantages of the invention will hereinafter appear.

Aqueous solutions have been concentrated by converting water to water vapor or ice, i.e. to the liquid or vapor phase and then separating the converted phase from the aqueous solution. Vapor phase conversion is not generally suitable for the concentration of solutions containing heat sensitive substances. Solid phase conversion, effected at low temperatures, is more suitable for concentrating heat sensitive solutions; for volatile flavors are retained and heat sensitive flavors are unaffected. A serious problem encountered in crystallizing the solvent in the latter type process has been the ease with which the solvent crystallizes on the heat transfer surfaces thus reducing the ability of the equipment to transfer the heat of crystallization from the solution to the cooling medium.

In accordance with the invention, a process and means have been discovered that prevent the deposition of the solvent as crystals on heat transfer surfaces. The discovery is based on the work (energy) required to form a deposit on the surface correlated with the surface energy of the heat transfer surfaces while in contact with a slurry of ice crystals uniformly dispersed thoughout an aqueous solution. It has been found that if the surface energy of a heat transfer surface is less than the work required to form ice deposits, none will form on the surface providing the surface is also in contact with a slurry of crystals.

An aqueous solution at a temperature below its freezing point and in the presence of nuclei will form or grow crystals. The heat of crystallization in the solution will be released principally either in the creation of nuclei or as crystal growth. The nuclei may be added to or formed in the solution or may form on the heat exchange surfaces. In accord with the invention it has been found that the energy required to form crystals can be controlled by regulating the temperature difference between the average temperature of the solution and the temperature of the heat transfer surface. Moreover, the energy of crystal formation on surfaces varies inversely as the square of the natural logarithm of the ratio of concentration of solvent in the bulk of the saturated solution to the concentration of solvent in a solution saturated at the surface temperature. The partition ratio, i.e. the ratio of the release of the heat of crystallization as crystal growth to the release of heat as surface nuclei, appears to favor release of the heat as crystal growth. In any case it has been found that by the use of heat transfer surfaces having a low surface energy the partition ratio favoring release of the heat of crystallization as crystal growth is increased.

These theoretical considerations have been confirmed by research in the laboratory and in practice. From this work it has been determined that the permissible temperature difference to avoid crystal formation on heat transfer surfaces varies with the solution composition and the material of construction of the heat transfer surface. Surface tension of the solution also enters into the determination of the permissible temperature difference that may be used between the surface of the heat transfer means and the average temperature of the aqueous solution. That temperature difference has furthermore been indicated as varying directly as the surface tension cubed.

The surface energies of solids are difficult to determine accurately and little information on surface energies has been published. At the present state of the art, it is necessary to determine the difference experimentally and by actually measuring the temperature difference between the heat transfer surface and the bulk of the solution that can be used without forming the undesirable surface adhering crystals. The temperature differences vary from 0.1° F. to over 10.0° F. and higher and depend on the composition of the solution, the concentration of the solvent in the solution, the concentration of the crystals in the slurry, and the composition of the heat transfer surface.

stainless steel. This table shows the superiority and relative advantages of these materials:

| Solution | Concentration, percent by Weight | Temperature Difference Permissible | | | | | |
|---|---|---|---|---|---|---|---|
| | | SN | Coated Al | Al | Al Brass | Cu | Stainless Steel |
| Orange Juice | 37 | 3.5 | 3.5 | 3.4 | 1.8 | .6 | .14 |
| Coffee | 40 | 7.0 | 7.0 | 6.0 | 2.5 | .4 | .12 |
| Beer | 40 | 12.0 | 12.0 | 10 | 7 | 2.5 | .4 |

It is not necessary to know the exact surface energy of the base material or the energy required to form a crystalline surface. The relative values can be determined experimentally for one set of conditions and using theoretical equations other values can be calculated.

The drawings illustrate by graphs the comparative value of the various heat transfer surfaces used to crystallize water ice from orange juice, coffee, and beer solutions. More specifically aqueous solutions containing about 20% by weight of ice were passed through the central zone 1 of tube 2 (see FIG. I) and in indirect heat exchange relationship with a refrigerant flowing through jacket 3 of the tube. A number of steady states were run, the slurry being pumped around the circuit shown, and at successively lower and lower temperatures until a temperature was reached at which ice began to form on heat transfer surface 4. A temperature about 0.1° F. above the crystal forming temperature differential was deemed to be the temperature at which crystallization was permissible (i.e., crystallization within the slurry without crystallization on the walls of the heat transfer surface). The temperature differential was taken between the solution and the temperature of the tube wall for the particular concentration of the solvent in the solution, and the material of construction of the heat exchange wall used. These permissible temperatures were plotted as the determinants of the attached graphs.

The particular metal transfer surface selected for use is, as has been noted, used to crystallize an aqueous solution containing ice crystals on which (preferentially) to effect the crystal growth. Crystals are present in the solution in amounts ranging from 5 to 25 or more percent by weight and the solution agitated to provide adequate and uniform dispersion of the crystals throughout the solution and in proximate contact with the heat exchange surface. The crystals grown are separated from the slurry by any suitable process such as filtration, centrifuging, etc.

Any aqueous solution can be concentrated in accordance with the invention and more especially aqueous extracts such as: fruit juices, e.g., orange, lemon, pear, grape, apple; potable liquids, e.g., milk, wine, beer, coffee, tea; vegetable juices, e.g., tomato, carrot, cabbage, onion, and beet and the like. The invention may also be used for the desalinification of saline water, e.g., brine, sea water, brackish water, etc., and the concentration of aqueous solutions of organic and inorganic compounds generally.

On the graphs, concentrations of the orange juice and the coffee are given in percent by weight total solids in the solution being crystallized; the beer concentrations are in percent by weight of alcohol. These concentrations are plotted against the permissible temperature difference between the aqueous solution being crystallized and the tube wall in degrees F. The graphs show the permissible temperature differences for tin, aluminum, coated aluminum, aluminum-brass (Ampco), copper, titanium, and stainless steel.

It will be seen that coated (anodized) aluminum and tin are superior to all of the metals illustrated in the graphs, plain aluminum running a close third and aluminum brass fourth. It has been found in accordance with the invention that certain coatings of the metals are advantageous providing they are non-polar, polar coatings having strong positive and negative groupings appear to attract and hold water and decrease the permissible temperature differential that may be used. Low melting metals having low surface energy are generally recommended depending on their non-toxicity, good heat conductivity, and non-corrosion properties in the solution being concentrated. Preferably those metals are used that melt below around 1,000° C.; including with those considered above: antimony, cadmium, lead, and magnesium. These metals can be used as the sole material of construction of the heat exchanger or be coated by plating or otherwise deposited on the surface of a heat exchanger metal, the deposit being in direct contact with the solution being concentrated. While the invention is directed primarily to the use of heat transfer surfaces in conjunction with a flow of solution past the surface, the apparatus may contain any suitable type of stirring device to increase solution turbulence in the crystallization zone. Moreover, the heat transfer surface may be rotated, oscillated, vibrated, or otherwise moved relative to the solution to effect or increase the turbulence between the surface and the solution being crystallized.

The process, apparatus, materials, and conditions herein described may be modified in many ways that are within the purview of the invention without departing therefrom or without operating outside the scope of the claim.

The claim:

A process for the crystallization and separation of water in the form of ice from a slurry of at least 5% by weight of ice crystals dispersed in a coffee solution, between about 6.5 and 60% by weight of coffee to the weight of the solution, comprising the steps of cooling the coffee solution to a temperature below its freezing point by indirect heat exchange of the slurry through a metal heat transfer surface, selected from the group consisting of tin and anodized aluminum, with a cooling medium, constantly agitating said coffee solution, maintaining a predetermined temperature difference between about .1° F. and 9° F. between the said heat transfer surface and the coffee slurry, the predetermined temperature difference being determined with reference to the coffee line for coated aluminum-tin in FIGURE II of the drawing and selected as a point on that line for a corresponding concentration of weight percent of coffee to the weight of the substance being treated, such that the said heat transfer surface resists the deposition of ice crystals thereon and substantially all of the ice crystals formed in the solution can be removed from said body of solution.

(References on following page)

References Cited

UNITED STATES PATENTS

| | | | |
|---|---|---|---|
| 2,119,182 | 5/1938 | Schuftan et al. | 62—58 X |
| 2,439,434 | 4/1948 | Lindgren | 62—58 X |
| 2,559,205 | 7/1951 | Wenzelberger | 62—58 X |
| 2,685,783 | 8/1954 | Benscheidt et al. | 62—58 X |
| 2,778,205 | 1/1957 | Berger | 62—58 X |
| 2,800,000 | 7/1957 | Berger | 62—58 X |
| 2,960,843 | 10/1960 | Zdansky et al. | 62—58 X |
| 2,977,234 | 3/1961 | Wenzelberger | 62—58 X |
| 3,004,397 | 10/1961 | Wenzelberger | 62—58 X |

NORMAN YUDKOFF, *Primary Examiner.*

G. HINES, *Assistant Examiner.*